Patented May 23, 1944

2,349,774

UNITED STATES PATENT OFFICE 2,349,774

ACETOXYAMINO ACIDS AND METHOD FOR THEIR PREPARATION

Gerrit Toennies, Gladwyne, Pa., assignor to The Lankenau Hospital, Philadelphia, Pa., a corporation of Pennsylvania No Drawing. Application June 19, 1942, Serial No. 447,742

14 Claims. (Cl. 260—471)

This invention relates to a process for producing O-acetyl derivatives of hydroxy amino acids and more particularly to a method for replacing by acyl groups the hydrogen of hydroxy and analogous groups in compounds which also contain amino groups without the replacement of amino hydrogen atoms. This invention also relates to previously unknown acyloxyamino acids and specifically O-acetyl derivatives of hydroxy amino acids in which the hydrogen of the hydroxy groups present is replaced by one or more acetyl groups.

It has long been known that anhydrides such as acetic anhydride may be employed where it is desired to substitute an acyl group for a replaceable hydrogen atom in hydroxy, amino and similar groups. However, prior to the present invention no method has been discovered for the selective substitution of such replaceable hydrogen atoms by acyl groups in amino acids whereby the replaceable hydrogen of an hydroxy group could be substituted while the substitution of replaceable hydrogen in amino groups or the like occurring in the same compound would be inhibited so that the O-acyl amino compound could be isolated.

I have discovered a process for accomplishing this result together with a process for the isolation of the previously unknown O-acyl derivatives thus formed. As set forth in the examples, this process includes the use of a strong acid, such as perchloric acid, or sulfuric acid, 2,4 dinitro benzene sulfonic acid or equivalent strong acids during the acylation step. When the reaction medium consists chiefly of acetic acid, the effect of such strong acids, when present stoichiometrically in excess over the amino or other basic groups present, seems to be to accelerate the acylation of hydroxy and analogous groups while at the same time inhibiting the acylation of amino groups present in the same compound. It is thus possible, for instance, by the use of an excess of acetic anhydride, to bring about acetylation of the hydroxy groups in such amino acid compounds as hydroxyproline, serine, threonine, and tyrosine before any appreciable amounts of the amino groups contained therein have been acetylated. I have found that it is possible to remove by hydration the remaining acetic anhydride by adding a moderate excess of water which reacts with the acetic anhydride under the catalytic accelerating influence of the strong acid which is, of course, still present. The strong acid is then neutralized by a suitable organic base, such as amylamine, or butylamine, pyridine, aniline, dimethyl aniline, etc., and the desired O-acetyl amino acid can then be isolated in crystalline form either by spontaneous precipitation or by an accelerated precipitation brought about by the addition of a solvent or a solvent combination miscible with the medium containing the desired reaction product in which at the same time the desired reaction product is less soluble than in the medium. This results in a lowering of the solubility of the O-acetylamino acid and makes possible a recovery of 80 to 90 per cent of the O-acetylamino acid. At the same time any N-acetylamino acids that may be present remain dissolved in the solvent.

I have found that ordinary hydroxy groups as found in such compounds will respond to the process of this invention regardless of their position in the molecule. It also appears that certain other groups possess a reactivity similar to that of hydroxy groups within the sense of the present invention. For instance the heterocyclic —NH— groups, imino (=NH) groups and thiol (—SH) groups may be similarly acetylated in amino acids to the exclusion of acetylation of the amino groups in compounds such as tryptophane, arginine and cysteine, respectively. However, the present application is expressly limited to O-acyl compounds and is not intended to cover the N- and S-acyl compounds.

Having described my invention in general terms, I will now describe it in more specific terms by way of example but not in limitation thereof.

Example 1

By appropriate dilution of concentrated aqueous perchloric acid with acetic acid, an aceteous solution 0.60 molar in $HClO_4$ and about 1.7 molar in $H_2O$ is prepared. 100 cc. of this solution are added to 9.24 grams (50 millimoles) of finely pulverized l-tyrosine. After solution is complete, acetic anhydride is added. Its amount corresponds, first, equimolarly to the total water present, and, in addition, to a 40 per cent excess over that required for the O-acetylation. Because of the heat of reaction it is advisable to run the concentrated acetic anhydride slowly into the solution, which is cooled by gentle swirling in an ice bath. The combined solution is kept in a glass-stoppered flask for about one hour at room temperature, in order to insure completion of the O-acetylation. Thereupon 2 cc. (110 millimoles) of water are added which under the prevailing conditions of acid catalysis will eliminate all remaining acetic anhydride.

After one hour is allowed for this reaction (hydration of the residual acetic anhydride) 80 millimoles of commercial amylamine are added to the solution with cooling, followed by a mixture of 250 cc. acetone and 750 cc. ether. After at least one night in the refrigerator the precipitated O-hydroxy derivative is filtered, thoroughly washed with ether and carefully dried to constant weight. The product so obtained, O-acetyl-1-tyrosine, when recrystallized from 50 per cent alcohol, is a white crystalline substance which decomposes at 213-214° C. and has an equivalent weight as determined by titration with perchloric acid, within 1 or 2 per cent of the theoretical value of 223.1.

Example 2

50 millimoles of finely pulverized 1-hydroxyproline are treated in the same way as set forth in Example 1. Following the addition of the amylamine 250 cc. methyl cellosolve and 2000 cc. ether are added, or, alternatively 200 cc. butyl ether and 2000 cc. ether are added. The O-hydroxy derivative is recovered in the same way as in Example 1. The product so obtained, O-acetyl-1-hydroxyproline, when recrystallized from 50 per cent alcohol, is a white crystalline substance which decomposes at 179-181° C. and has an equivalent weight as determined by titration with perchloric acid of 177 and with sodium methylate of 174.

Example 3

50 millimoles of finely pulverized dl-serine are treated in the same way as set forth in Examples 1 and 2. Following the addition of the amylamine, 1200 cc. of ether are added and the same procedure followed as in Examples 1 and 2. The product so obtained, O-acetyl-dl-serine, when recrystallized from 50 per cent alcohol, is a white crystalline substance which decomposes with evolution of gas at 143-144° C. and has an equivalent weight as determined by titration with perchloric acid of 147 and with sodium methylate of 150.

Example 4

50 millimoles of finely pulverized dl-threonine are treated in the same way as set forth in Examples 1, 2 and 3. Following the addition of the amylamine 50 cc. of butyl ether and 1000 cc. of ether are added and the same procedure followed as in Examples 1, 2 and 3. The product so obtained, O-acetyl-dl-threonine, when recrystallized from 50 per cent alcohol, is a white crystalline substance which decomposes with evolution of gas at 146-149° C. and has an equivalent weight as determined by titration with perchloric acid of 165 and with sodium methylate of 163.

The products and the process of the present invention have great value in the field of amino acid investigation and present for the first time amino acid derivatives having hydroxyl groups converted into aliphatic acyl derivatives, and unaffected amino groups.

While the specification and claims refer to acetylation it will be understood by those skilled in the art that, for the reaction medium and the anhydride serving as the acylating agent, other acyl groups may be employed in the practice of this invention and it is intended that the annexed claims should include such acyl compounds as being equivalents of the acetyl groups referred to therein. Moreover it will be understood that equivalent strong acids and equivalent organic bases and solvents may be used, all within the scope of the invention as defined in the appended claims.

Having thus described my invention, I claim:

1. O-acetoxyamino acids in which the amino groups are not acetylated having the following general formula: ROCOCH$_3$; said formula indicating a compound in which the —OH group of a hydroxyamino acid is replaced by —OCOCH$_3$, and the hydroxyamino acids in question being compounds which derive from $\alpha$-amino carboxylic acids by the replacement of one or more carbon-bound hydrogen atoms by —OH groups.

2. O-acetyltyrosine.

3. O-acetylhydroxyproline.

4. O-acetylthreonine.

5. In a process for the preparation of acetoxyamino acids, the steps which comprise reacting hydroxyamino acid with acetic anhydride in a reactive medium consisting chiefly of acetic acid and in the presence of a strong acid of the group consisting of perchloric, sulfuric, and dinitrobenzenesulfonic acids, in an amount which is stoichiometrically in excess over the amino or other basic groups present, and then recovering the acetoxyamino acid thus formed.

6. The process of claim 5 wherein the strong acid is perchloric acid.

7. In a process for the preparation of acetoxyamino acids, the steps which comprise reacting hydroxyamino acid with acetic anhydride in a reactive medium consisting chiefly of acetic acid and in the presence of a strong acid of the group consisting of perchloric, sulfuric, and dinitrobenzenesulfonic acids, in an amount which is stoichiometrically in excess over the amino or other basic groups present, eliminating the residual acetic anhydride by hydration, neutralizing said strong acid with an organic base and recovering the desired acetoxyamino acid by crystallization.

8. The process of claim 7 wherein the organic base is amylamine.

9. The process of claim 7 wherein the crystallization step is carried out with the addition of an organic solvent.

10. The process of claim 7 wherein the crystallization step is carried out with the addition of an ether.

11. A process for the preparation of O-acetyl amino acids which includes the steps of reacting hydroxyamino acid with acetic anhydride in a reactive medium consisting chiefly of acetic acid and in the presence of a strong acid of the group consisting of perchloric, sulfuric, and dinitrobenzenesulfonic acids, in an amount which is stoichiometrically in excess over the amino or other basic groups present, eliminating the residual acetic anhydride by hydration, neutralizing said strong acid with an organic base, adding an organic solvent, allowing precipitation, and then washing and drying the precipitate.

12. A process for the preparation of O-acetyl-1-tyrosine which includes the steps of reacting tyrosine with acetic anhydride in a reactive medium consisting chiefly of acetic acid and in the presence of a strong acid of the group consisting of perchloric, sulfuric, and dinitrobenzenesulfonic acids, in an amount which is stoichiometrically in excess over the amino or other basic groups present, eliminating the residual acetic anhydride by hydration with water, neutralizing said strong acid with amylamine, adding a mixture of acetone and ether, allowing precipitation and then washing and drying the precipitated O-acetyl-1-tyrosine.

13. A process for the preparation of O-acetyll-hydroxyproline which includes the steps of reacting l-hydroxyproline with acetic anhydride in a reactive medium consisting chiefly of acetic acid and in the presence of a strong acid of the group consisting of perchloric, sulfuric, and dinitrobenzenesulfonic acids, in an amount which is stoichiometrically in excess over the amino or other basic groups present, eliminating the residual acetic anhydride by hydration with water, neutralizing said strong acid with amylamine, adding a mixture of methyl cellosolve and ether, allowing precipitation and then washing and drying the precipitated O-acetyl-l-hydroxyproline.

14. A process for the preparation of O-acetyl-dl-threonine which includes the steps of reacting dl-threonine with acetic anhydride in a reactive medium consisting chiefly of acetic acid and in the presence of a strong acid of the group consisting of perchloric, sulfuric, and dinitrobenzenesulfonic acids, in an amount which is stoichiometrically in excess over the amino or other basic groups present, eliminating the residual acetic anhydride by hydration with water, neutralizing said strong acid with amylamine, adding a mixture of butyl ether and ether, allowing precipitation and then washing and drying the precipitated O-acetyl-dl-threonine.

GERRIT TOENNIES.